Oct. 21, 1924. 1,512,609
C. W. A. KOELKEBECK
CHAIN
Filed July 12, 1920 2 Sheets-Sheet 1
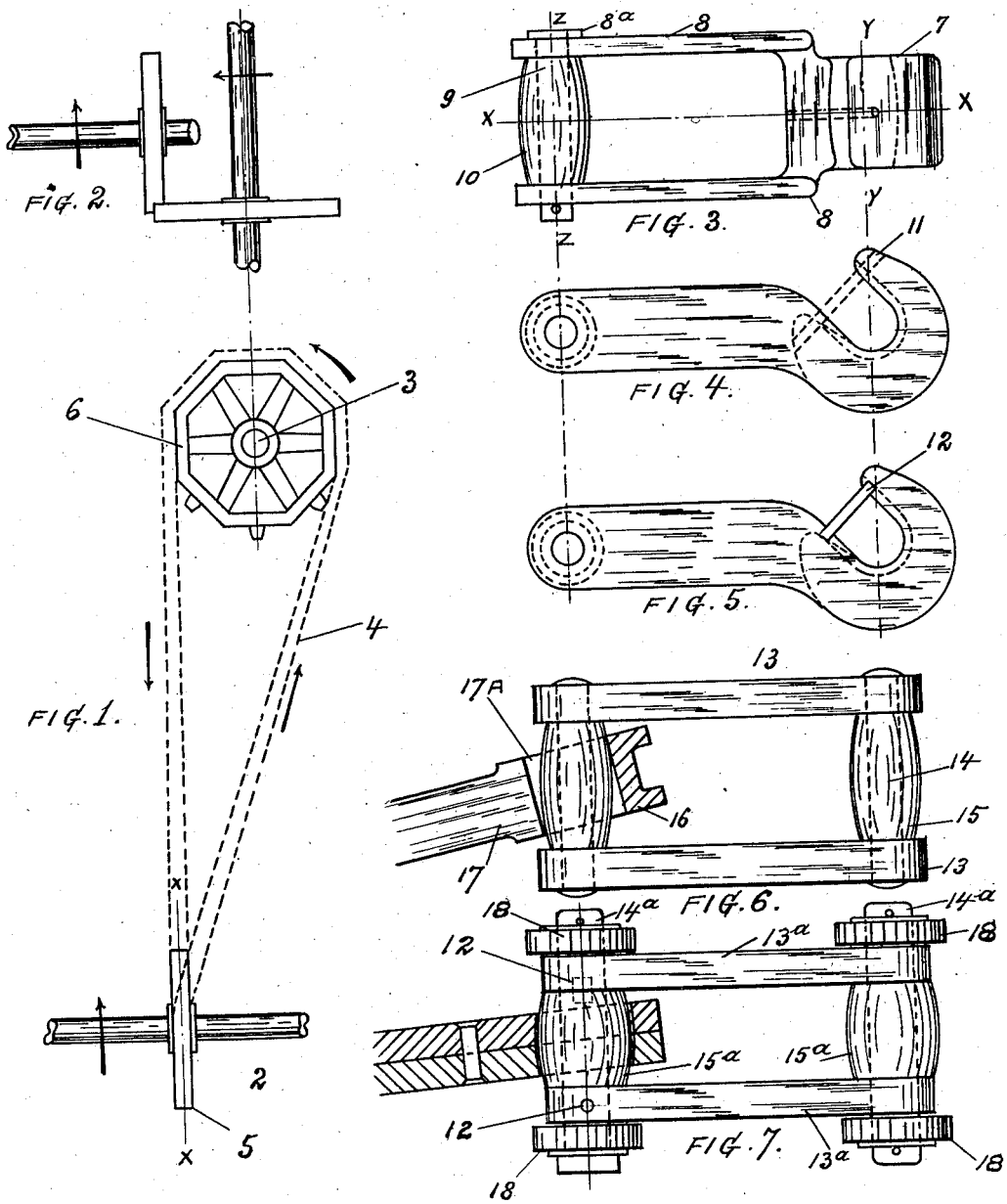
INVENTOR.
Carl W. A. Koelkebeck, Oct. 21, 1924.  
C. W. A. KOELKEBECK  
CHAIN  
Filed July 12, 1920  
1,512,609  
2 Sheets-Sheet 2
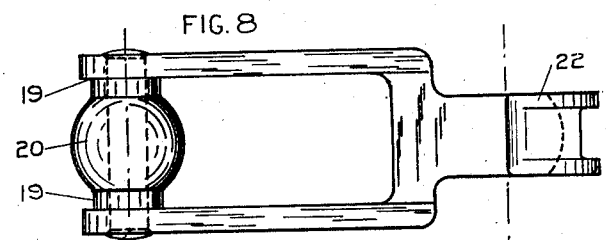
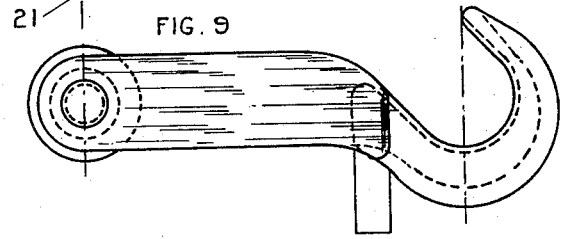
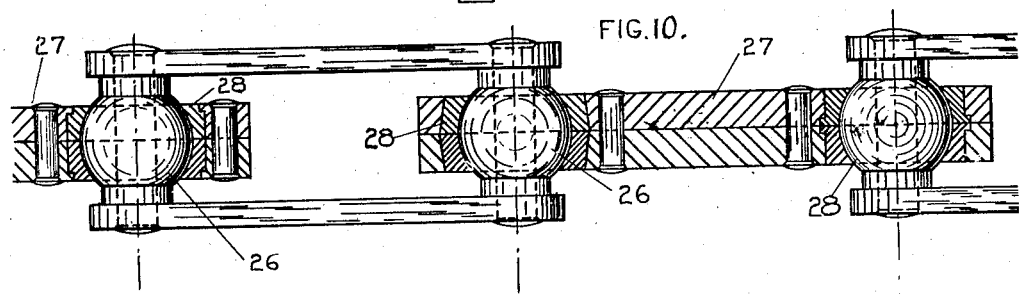
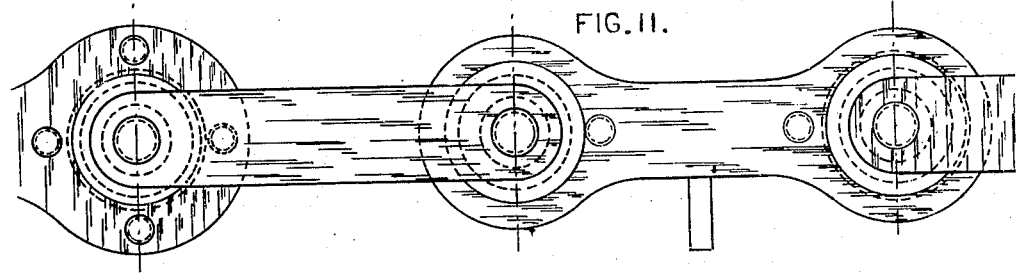
INVENTOR.  
Carl W. A. Koelkebeck.

Patented Oct. 21, 1924.

1,512,609

UNITED STATES PATENT OFFICE.

CARL W. A. KOELKEBECK, OF PITTSBURGH, PENNSYLVANIA.

CHAIN.

Application filed July 12, 1920. Serial No. 395,584.

*To all whom it may concern:*

Be it known that I, CARL W. A. KOELKEBECK, a citizen of the United States, residing at Pittsburgh, Allegheny County, Pennsylvania, have invented a new and useful Improvement in Chains, of which the following is a full, clear, and exact description, reference being had to the accompanying drawings, forming part of this specification, in which—

Figure 1 is a diagrammatic view illustrating one application of my improved chain;

Figure 2 is a plan view of the same;

Figure 3 is a plan view showing one form of chain link embodying my invention;

Figure 4 is a side view of the same;

Figure 5 is a view similar to Figure 4, showing a modification;

Figures 6 and 7 are views partly in plan and partly in horizontal section showing other modifications;

Figure 8 is a plan view and Figure 9 a side view of a link embodying another modification;

Figure 10 is a view partly in plan and partly in horizontal section of a portion of the chain showing still another construction; and Figure 11 is a side view of the parts shown in Figure 10.

My invention has relation to chains, or link belts, which are capable of use both for the transmission of power and as conveyors. It has been established that chains may be used more economically for transmission of power than other forms of belts, and the present invention relates to improvements in chains of the character particularly adapted for use where the motion of the chain has a varying angle to the axis of the shaft.

Referring to the accompanying drawings, in which I have shown a number of different embodiments of my invention, I have illustrated in Figures 1 and 2 the use of my improved chain in the case of two connected shafts whose axes are at right angles to each other.

In these two figures, the shaft indicated at 2 may be considered the driving shaft, 3 the driven shaft, and 4 a chain connecting said shafts and embodying my invention, this chain passing over the toothed or sprocket wheels 5 and 6, located on the respective shafts. In order to permit the use of my invention in connection with shafts of this angular arrangement, the direction of motion of the shafts and chain must be as indicated by the arrows in said Figures 1 and 2. It will be noted from Figure 1 that the chain in moving toward the upper sprocket wheel 6 diverges from the lowest part of wheel 5 to an amount equal to the pitch diameter of the wheel 6. This divergence causes the path of the chain to be curved just above the horizontal axis of the wheel 5. It is to take care of this necessary condition that my invention has been particularly provided. I will now proceed to describe the means which I employ for this purpose.

Referring first to the construction illustrated in Figures 3 and 4, my chain link comprises a hook 7, formed at one end of the link, the two side or flank members 8, and a tie or cross member which in the form shown in these figures comprises a transverse pin 9, seated in the side members and a hook-bearing member 10, rotatably mounted upon said pin between the side members.

To facilitate the subsequent description and correct understanding of the invention, I hereinafter refer to the line X—X of Figure 3 as the longitudinal axis of the link and chain, to the line Y—Y in said figure as the axis of the hook perpendicular to the axis of the link, and to the line Z—Z as the axis of the cross member which is also perpendicular to the axis of the link.

In order to permit the chain to make the sidewise twist under the conditions, such as shown in Figure 1, the cross member of the link is provided with a curved or convex bearing surface for engagement with the hook of the next adjacent link. The bearing surfaces both of the hook and cross member may be of various forms. In Figures 3, 4, 5, 6 and 7, I have shown the cross member as being of barrel shape, the convex surface being struck on radii away from the axis Z—Z. In Figures 3, 4 and 5, the interior bearing surface of the hook is shown as having a corresponding curvature. In order to prevent disengagement of the hooks, they are shown as provided with keepers. These keepers may consist of a pin across the jaws of the hook, as shown at 11 in Figure 4, or a plate placed between said jaws, as shown at 12 in Figure 5.

In Figure 6, I have illustrated another construction in which the side members of links 13 are connected at each end by pin 14 and bearing member 15, similar to the corresponding member shown in Figure 3, while the hook 16 is formed on a separate intermediate link 17, the member 17 being designed to carry a hook at each end and these hooks alternating with the links. In this figure also, I have shown the bearing surfaces 17$^a$ inside the hook as being straight, but with sufficient clearance to permit the hooks and links to assume different angular positions with respect to each other. In this construction, as well as in those shown in the figures previously referred to, the hooks will readily slide or move over the curved surfaces of the cross members so as to permit the necessary angling movements.

The construction shown in Figure 7 is similar to that shown in Figure 6, but the hook link has closed eyes for engagement with the cross member 15$^a$ of the adjacent links, and is formed in two parts, each part being engaged with the cross member by slipping it over one of the ends thereof, and the two members then being riveted or otherwise rigidly secured to each other. In this figure I have also shown the pins 14$^a$ as being extended beyond the links 13$^a$ a sufficient distance to enable rollers 18 to be mounted thereon, and which may be provided, if desired, for the purpose of reducing the friction caused by the travel of the chain. Such rollers may be provided at every pin or they may be placed at any desired distance apart, as may be most advisable in any particular case.

In the several forms of my invention now to be described, the cross member of the link instead of being barrel-shaped, has an approximately spherical bearing surface, the center of the sphere being on the axes Z—Z and X—X before referred to.

In the construction shown in Figures 8 and 9, the cross member 19 having the spherical portion 20 is mounted on the pin or rivet 21. In this construction, the bearing surfaces of the sphere and of the hook 22 may be machined, so as to obtain a very accurate bearing between their surfaces.

In the construction shown in Figures 10 and 11, the cross members 26 are in the form of spheres, and each of the two-part hook links 27 (similar to that shown in Figure 7) is provided with bushings 28 which fit the spherical bearings and which can be renewed, if desired, when worn out.

The advantages of the present invention arise from mounting the bearing member of the link to rotate upon a pin instead of forming said bearing integral with the link as heretofore. With this construction, when the link passes around the sprocket wheel the bearing member rotates on the pin instead of the link rotating upon the bearing member. The force required, therefore, to turn the link on the axis Z—Z is materially less than if the link turned on the bearing member; because when the bearing member turns on the pin, frictional resistance to turning acts through a lever arm equal to the radius of the pin instead of through a lever arm equal to the radius of the bearing member at its point of maximum diameter. With my improved chain the usual pivoting movement between links occurs between the pin and the bearing member mounted thereon, while universal movement is provided between the bearing member and the portion of the link engaging the same, thereby providing a highly efficient chain for connecting non-parallel non-intersecting shafts and for other types of drives.

I claim:

1. In a chain, a plurality of links having connections permitting universal movement, each of said connections comprising a pin, a bearing member having a curved bearing surface rotatably mounted on said pin for rotation about the axis of said pin, and a portion engaging the bearing member and universally rotatable about the surface thereof, substantially as described.

2. A drive chain, comprising a pair of connected links having a plurality of cooperating bearing surfaces, one bearing surface being adapted to provide a relative movement in one plane between the links, and the other bearing surface being adapted to provide universal movement between the links, substantially as described.

In testimony whereof, I have hereunto set my hand.

CARL W. A. KOELKEBECK.